United States Patent [19]

Bailey et al.

[11] Patent Number: 4,951,245
[45] Date of Patent: Aug. 21, 1990

[54] NETWORK TERMINAL DRIVER COMMUNICATIONS SUBSYSTEM

[75] Inventors: Christopher R. M. Bailey, Hollis, N.H.; John R. Mandile, Medford, Mass.; Daniel G. Peters, Nashua, N.H.; James W. Stonier, Tewksbury, Mass.

[73] Assignee: Bull HN Information Systems Inc., Billerica, Mass.

[21] Appl. No.: 196,597

[22] Filed: May 20, 1988

[51] Int. Cl.⁵ .................. G06F 3/00; G06F 13/38
[52] U.S. Cl. .................. 364/900; 364/919; 364/933.9; 364/946.2; 364/978.3
[58] Field of Search ... 364/200 MS File, 900 MS File

[56] References Cited

U.S. PATENT DOCUMENTS

| | | | |
|---|---|---|---|
| 3,937,925 | 2/1976 | Boothroyd | 235/61.7 |
| 4,281,315 | 7/1981 | Bauer et al. | 340/147 |
| 4,701,841 | 10/1987 | Goodrich et al. | 364/200 |
| 4,734,853 | 3/1988 | Nakano | 364/200 |
| 4,756,007 | 7/1988 | Qureshi et al. | 375/37 |
| 4,787,028 | 11/1988 | Finfrock et al. | 364/200 |

Primary Examiner—Raulfe B. Zache
Assistant Examiner—Glenn Richman
Attorney, Agent, or Firm—George Grayson; John S. Solakian; Gerald J. Cechony

[57] ABSTRACT

In a data processing system having a plurality of remote terminals, possibly of several kinds, connected by a plurality of communications media, also possibly of several kinds, from which terminals users may run a plurality of application programs in the central processing unit (CPU) of the data processing system, the CPU is provided with a network terminal driver for regulating transmissions between the various application programs and the various types of terminals over the various types of communications media. Means are provided for specifying the characteristics of the various types of application programs, terminals, and communications media, and the network terminal drive is responsive to those means.

2 Claims, 12 Drawing Sheets

| WORD OFFSET | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0/1 | IRB POINTER |||||||||||||||||
| 2 | RETURN STATUS |||||||||||||||||
| 3 | LRN ||||||| B || E | FUNCTION ||||
| 4/5 | BUFFER ADDRESS - 2 WORD POINTER |||||||||||||||||
| 6 | RANGE - NUMBER OF BYTES TO BE TRANSFERRED |||||||||||||||||
| 7 | DEVICE - SPECIFIC WORD |||||||||||||||||
| 8 | RESIDUAL RANGE - NUMBER OF BYTES NOT TRANSFERRED |||||||||||||||||
| 9 | DEVICE STATUS WORD 1 |||||||||||||||||
| 10 | TOTAL IORB EXTENSION LENGTH (IN WORDS) |||||||| PHYSICAL I/O EXTENSION LENGTH (IN WORDS) ||||||||
| 11 | DEVICE - SPECIFIC WORD 2 |||||||||||||||||
| 12 | DEVICE PHYSICAL CONTROL WORD 1 |||||||||||||||||
| 13 | DEVICE PHYSICAL CONTROL WORD 2 (VALID IF B BIT (E) IS 1) |||||||||||||||||
| 14 | ADDITIONAL STATUS |||||||||||||||||
| 15 | CURSOR POSITIONING |||||||||||||||||
| 16 | DEVICE DEPENDENT : ATTRIBUTE OR DESCRIPTOR |||||||||||||||||
| 17 | PREORDER CONTROL |||||||||||||||||
| 18 | FIRST WORD OF LOGICAL PART OF IORB |||||||||||||||||

INPUT/OUTPUT REQUEST BLOCK (IORB) 6-20

*Fig. 4B*

| PMCB CONTROL WORD |
|---|
| QUEUE LINK TO NEXT PMCB |
| IORB POINTER |
| ERROR STATUS |
| RETURN STATUS 1 |
| RETURN STATUS 2 |
| RESIDUAL RANGE |
| DDCB CHAIN |
| QUEUE HEADER |

PROVIDER MODULE CONTROL BLOCK (PMCB) 6-402A

*Fig. 4C*

DEVICE DRIVER CONTROL BLOCKS (DDCB) 6-420A&B

NETWORK TERMINAL DRIVER COMMUNICATIONS SUBSYSTEM

BACKGROUND OF THE INVENTION

1. Field of Use

This invention relates to the data processing field and more particularly to data communications software which connects the data processing system to a variety of terminals requiring different communication technologies.

2. Description of the Prior Art

Over the years the data processing systems have changed from batch processing applications to interactive system applications. In a batch processing application, all of the processing is done at the computer site including all input into the data processing system.

As the technology improved, particularly in the terminal area, operators at remote terminals would key into their terminal and the information would be transferred to the central computer over communication lines. This required communication controllers at the computer site and software to drive these communication controllers. The software developed at that time was written in a low level assembly language, was designed for use with a specific communications technology and further designed to provide specific modes of application support. The terminals were also limited by having fixed data code characteristics.

This type of communication's controller hardware and software design presented a number of problems. The software was very difficult to maintain and modify. This is particularly true if the software had to be extended to support a new terminal which was added to the system.

Today terminals are being built with new and evolving technology in the communications area. However, the software in the central system is too rigid to adapt to these new technologies. If these terminals require extended modes of application support, it is difficult to adapt the software.

OBJECTIVES OF THE INVENTION

Accordingly, it is an objective of the invention to provide an improved communication subsystem which is readily adaptable to support additional terminals.

It is another objective of the invention to provide an improved communication subsystem which is readily adaptable to adding new modes of application support.

SUMMARY OF THE INVENTION

In addition to the hardware, a data communication subsystem includes a number of elements. These elements include Applications Software, a Network Terminal Driver and a Lower Layer Service Provider.

The Applications Software initiates actions to cause the communication subsystem, including the terminals, printers and the users to perform prescribed functions to accomplish a specified job.

The Network Terminal Driver includes a number of Application Modules, a number of Provider Modules and a number of Device Profiles all operative with a number of common Kernel Components.

The Application Modules interface with their respective applications software to support the specified modes of operation. The Kernel includes a number of common components which interact with the Application Modules, the Provider Modules and the Device Profiles to execute the Application Software requests.

DESCRIPTION OF THE PREFERRED EMBODIMENT

Figure 1:
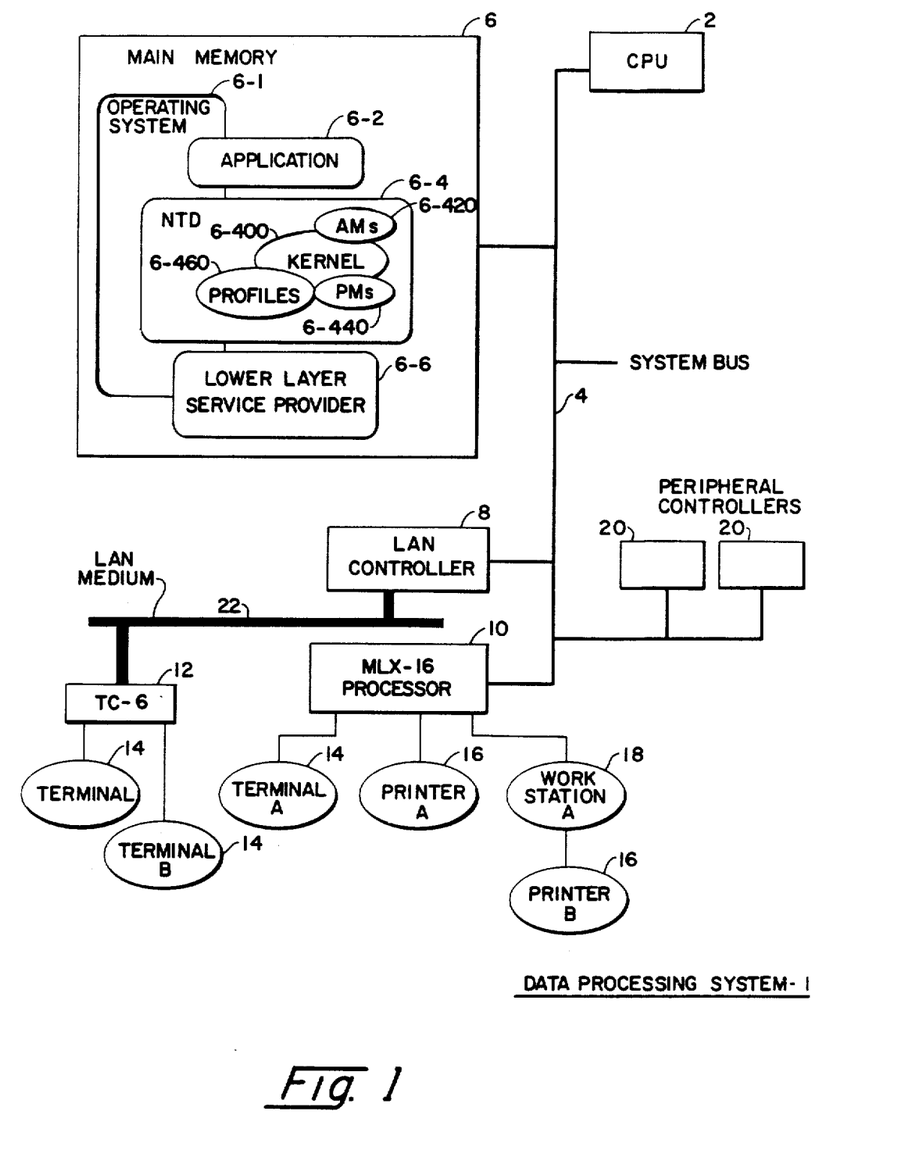
FIG. 1 shows an overall block diagram of a data processing system including a communication subsystem.

Referring to FIG. 1, a data processing system 1 includes a Control Processor (CPU) 2, a main memory 6, a number of peripheral controllers 20, a number of communication controllers, typically, a Local Area Network (LAN) controller 8 and an MLX-16 Processor 10, all coupled in common to a system bus 4. A number of devices typically are coupled to MLX-16 Processor 10. These devices may include a remote terminal A 14, a printer 16 and a workstation A 18. A printer B 16 may be coupled to workstation A 18.

A number of devices, typically, terminal B 14 and terminal C 14, are coupled to a terminal concentrator TC-6 12, which is, in turn, coupled to the LAN controller 8 by a LAN medium 22. Medium 22 could typically be an IEEE 802.3 Interface.

Main memory 6 includes a number of software units; an Operating System (OS) 6-1, Application Software 6-2, a Network Terminal Driver (NTD) 6-4, and a Lower Layer Service Provider 6-6. Typical Application Software 6-2 includes office systems, word processing systems, data entry facilities and database management systems. The Lower Layer Service Provider 6-6 contains the specific software for communicating with the LAN controller 8 and the MLX-16 Processor 10 via the system bus 4 under control of CPU 2.

The NTD 6-4 includes the software module that permit the user operating from a terminal 14 or workstation 18 to use a selected application stored in Application 6-2. The NTD includes several Application Modules (AM) 6-420, a Kernel Module 6-400, several Provider Modules 6-440 and several Device Profiles 6-460. The NTD 6-4 operates in a number of different modes depending on the type of device being supported and the way in which the applications software in Applications 6-2 utilizes the device.

An administration mode Application Module provides an interface to the devices which is used internally by the NTD 6-4 for device configuration and status inquiry, and is used by the applications software in Applications 6-2 for operations such as print screen.

A Message Mode Application Module supports a line at a time entry even though the data transfers between the terminal and the host takes place on a character basis. The CPU 2 is interrupted at the completion of a line of data.

A field mode Application Module supports a field at a time entry, even though the data transfers between the terminal and the host take place on a character basis. The type of data to be entered into the field is specified by the Application 6-2 and checked by NTD 6-4. The CPU 2 is interrupted at the completion of each field of data.

A block mode Application Module provides support for Application Software which operates with the intelligent terminal. Data transfers between the terminal and the host are in typically 256 byte blocks.

A printer mode Application Module provides support for both stand alone printers and those connected via a buffered printer adapter in a terminal or workstation.

A polled VIP mode Application Module provides an interface to applications that are operative with the MLX-16 Processor 10 that have terminals 14 and workstations 16 operating in a polling mode.

The Application Modules 6-420 interface to the applications software in Application 6-2, one Application Module 6-420 for each mode of operation. The Provider Modules 6-440 provide the necessary software for the NTD 6-4 to communicate with the communications controllers for the various supported communications technologies such as; the LAN controller 8 or the MLX-16 Processor 10 via the Lower Layer Service Provider 6-6.

Figure 2:
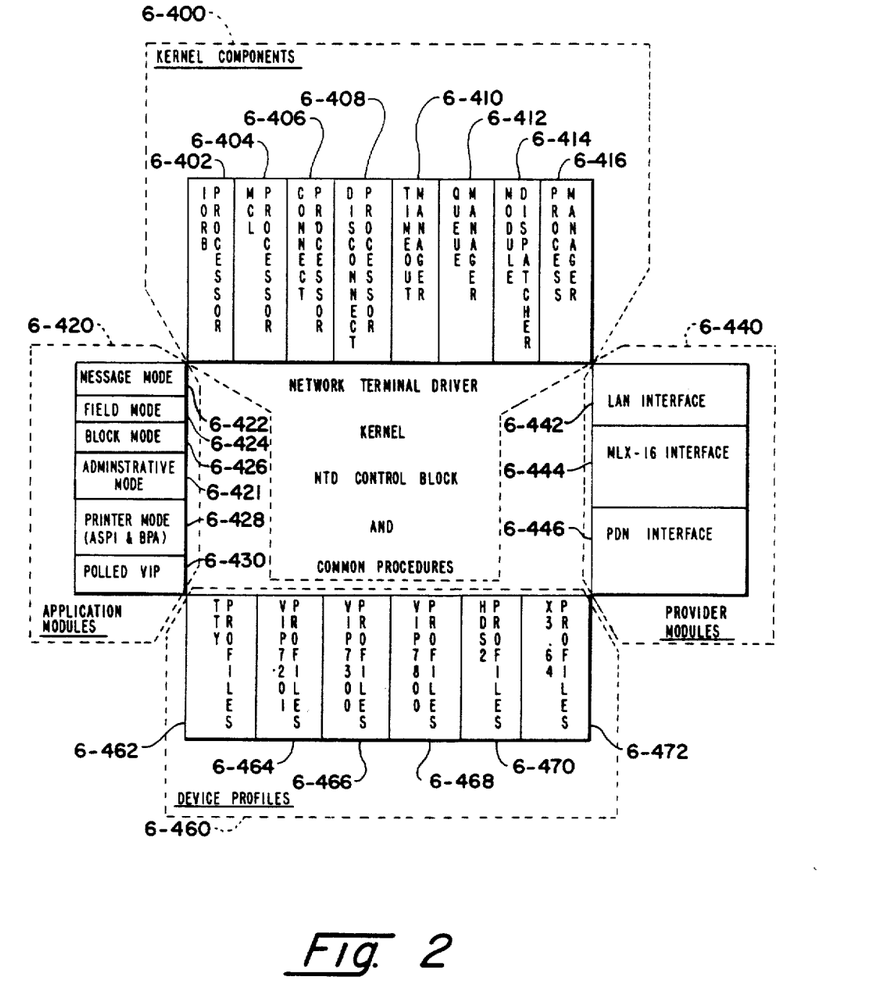
FIG. 2 shows an overall block diagram of a Network Terminal Driver of the communication subsystem.

FIG. 2 provides a more in-depth picture of the internal structure of the four major components of the NTD 6, namely, the Kernel 6-400, the Application Modules 6-420, the Provider Modules 6-440 and the Device Profiles 6-460.

The NTD 6 includes the Kernel 6-400 which has common interfaces to all of the Provider Modules 6-440 and the Application Modules 6-420. This allows for a new Provider Module or new Application Module to be added to the system without modification to the Kernel 6-400. The Application Modules 6-440 communicate with the terminal 14 or workstation 18 in the different modes, via an Administrative Mode 6-421, a Message Mode 6-422, a field mode 6-424, a block mode 6-426, a printer mode 6-428 or a polled VIP mode 6-430.

The Provider Modules 6-440 provide the required software interface to the Device Profiles 6-460. The Provider Modules 6-440 include a LAN interface 6-442, an MLX-16 interface 6-444 and a Public Data Network (PDN) interface 6-446.

There is a Device Profile for each type of device coupled to the LAN controller 8 and the MLX-16 Processor 10 as well as any other technologies. Typical Device Profiles are Teletype (TTY) profiles 6-462, VIP 7201 profiles 6-464, VIP 7300 profiles 6-466, VIP 7800 profiles 6-468, HDS 2 profiles 6-470, HDS7 profiles and X3.64 profiles 6-472.

The devices are typically Honeywell Bull Inc. VIP7201, VIP7300, VIP7800, HDS2, HDS5, HDS7 and X3.64 workstations. Each Device Profile may contain a table with the following information:

(a) profile name
(b) profile description
(c) workstation identifier
(d) code set supported by the workstation
(e) modes support by this profile
(f) system device and driver identity
(g) all character sequences required for NTD 6-4 to interact with the workstations.

This approach permits the adding of new devices without major changes to the software.

The Kernel 6-400 is made up of a number of components, including an Input Output Request Block (IORB) processor 6-402, a Monitor Call (MCL) Processor 6-404, a Connect Processor 6-406, a Disconnect Processor 6-408, a Timeout Manager 6-410, a Queue Manager 6-412, a Module Dispatcher 6-414, and a Process Manager 6-416.

The IORB Processor 6-402 handles Input Output Request Blocks (IORB) 6-20 which contain information on the structure of the data being transferred between main memory 6 and a specific terminal 14, printer 16 or workstation 18. The IORB Processor 6-402 defines and validates the characteristics and constraints upon the data being transferred.

Typical restraints are the range, the maximum number of characters being transferred during this data transfer, and the starting address, the main memory 6 location from which the first character is read, or to which the first character is written. Also other information in the IORB 6-20 specifies special control sequences to be sent to the terminal such as cursor positioning, bell or display attributes. During the Message Mode operation, therefore, an IORB 6-20 would be passed on to a Message Mode 6-422 of Application Modules 6-420 for further processing.

A Process Manager 6-416 identifies a requestor of an activated task and the requested task, obtains the necessary data structures, sets up the C language environment and dispatches program control to the NTD 6-4 component responsible for receiving the request. All processes dispatched by the Process Manager 6-416 are returned for proper termination.

The MCL Processor 6-404 interfaces with the OS 6-1, receives calls from OS 6-1, provides main memory 6 space for having NTD 6-4 execute the call and manages the return to OS 6-1. The MCL Processor 6-404 also may change certain configuration parameters specified in the Device Profile 6-460 for the terminal 14 or workstations 18.

The Connect Processor 6-406 manages the common connect responsibilities including establishing and monitoring the connection of NTD 6-4 to Application 6-2, and initiates configuring the terminals 14 and workstation 18 and any remote devices (not shown) involved in the communication.

The Disconnect Processor 6-406 manages the common disconnect responsibilities for all the modes supported by NTD 6-4. The Timeout Manager 6-410 makes use of the OS 6-1 Clock Manager to set up a timer, which generates a timeout if a specific operation being measured is not completed within the specified time. The system recognizes the error, posts it, and continues operation.

The Queue Manager 6-412 provides control supporting routines to be used in common by all Provider Modules 4-440. This support includes managing the Provider Module Control Block (PMCB) 6-402A queues for each workstation 18 and terminals 14 and manage one related typed data Device Driver Control Block (DDCB) 6-420A queue for each workstation 18 and devices 14.

A Module Dispatcher 6-414 ties together the Provider Module 6-440 and the Application Module 6-420 employed for the device. The Application Modules 6-420 need not know which Provider Module 6-440 will handle the call. The Module Dispatcher 6-414 maps the call to the Provider Module 6-442, 6-444 or 6-446 for servicing.

Figure 3:
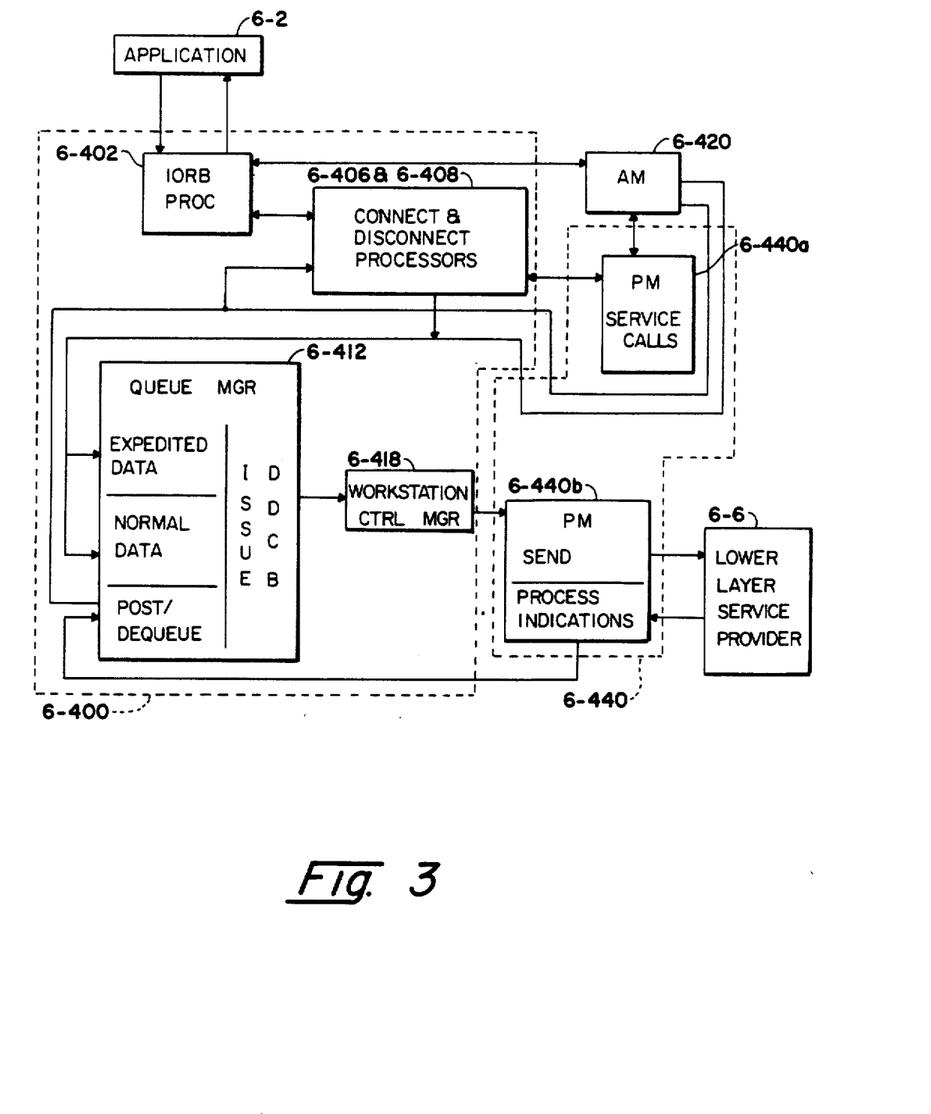
FIG. 3 shows a detailed block diagram of the flow of information through the Network Terminal Driver.

FIG. 3 shows the operation of the NTD 6. A user at a terminal 14 or workstation 18 selects an application and writes to the Cathode Ray Tube (CRT) screen at the terminal 14 or workstation 18. The Application 6-2 working with the user issues a write IORB to NTD 6.

The IORB Processor 6-402 begins to process the write IORB. The IORB Processor 6-402 makes sure the address location of the required data in main memory 6 is valid and the number of characters, the range, of data that will be transferred to the workstation 18. The IORB Processor 6-402 further checks that the options available to the terminal 14 or workstation 18 are allowed.

Write IORBs require additional mode specific processing so the IORB is passed to the Application Module 6-420. For example, if a word processing application is in effect, then the field mode 6-424 application module would perform a field mode specific procedure to validate the write operation.

Connect and Disconnect IORBs are handled in the same manner, but would require common processing as well as mode specific processing.

The IORB processor 6-402 passes a Connect IORB to the Connect Processor 6-406 to perform a common connect procedure before the Application Module 6-420 performs any mode specific connect processing.

Similarly, after the Application Module 6-420 performs any mode specific disconnect processing, the Disconnect Processor 6-408 performs a common Disconnect procedure. In either case, the Application Module 6-420, Connect Processor 6-406 or Disconnect Processor 6-408 makes calls to the Provider Module Service Calls 6-440A via the Module Dispatcher 6-414 to generate micro orders (DDCBs) to continue processing the IORB and ultimately accomplish the original request of the application as specified in the IORB. The DDCBs 6-420B created for an Application Module 6-402 have a mode specific purpose while DDCBs 6-420A created for either the Connect or Disconnect Processor are for purposes common to all application processing modes (e.g. common to field mode, message mode, etc.).

The appropriate Provider Module 6-440 is selected by the Module Dispatcher 6-414 in accordance with the hardware arrangement. Terminals connected to the LAN Controller 8 operate through the LAN Interface 6-442. Similarly, terminals connected to the MLX-16 Processor 10 operate through the MLX-16 Interface 6-444.

The IORB Processor 6-402 attaches a Provider Module Control Block (PMCB) 6-402A to the original application IORB 6-20. There is one PMCB 6-402A for each application IORB 6-20 that is issued to NTD 6-4. The PMCB 6-402A points to a string of Device Descriptor Control Blocks (DDCB) 6-420A and/or 6-420B. These are the string of micro instructions that execute the action requested by the application. When calls are made to the Provider Module Service Calls 6-440A, DDCBs 6-420A or 6-420B are generated and attached to the PMCB 6-402A.

The PMCB 6-402A and DDCB 6-420A and/or 6-420B are then passed to the Queue Manager 6-412. The Queue Manager 6-412 takes the PMCB and DDCBs and puts it in a queue for the requested terminal. The Queue Manager 6-412 issues the DDCBs, one at a time, to the Workstation Control Manager 6-420D. The Workstation Control Manager 6-420D performs any necessary workstation 18 or terminal 14 specific processing that must be done to insure that the DDCB will reach the proper device, and passes the DDCB to the PM 6-440B. Here again the Module Dispatcher 6-414 selects the proper PM 6-442, 6-444 or 6-446 by issuing the DDCB 6-420A or 6-420B to the Lower Layer Service Provider 6-6, which, in turn, will perform the specified microoperation on the requested terminal 14 or workstation 18.

The Queue Manager 6-412 continues to issue DDCB 6-420A or 6-420B until some kind of blocking condition is met. For example, the PM 6-440$b$ will set up write and read DDCB credits which determine how many read and write DDCBs the Queue Manager 6-412 can have outstanding at a time for that terminal 14 or workstation 18.

When the Provider Module 6-440$b$ is finished with the DDCB 6-420A or 6-420B, it calls the Queue Manager 6-412 post/dequeue. The Queue Manager 6-412 then copies any pertinent status into the PMCB 6-402A and calls the Application Module 6-420 if necessary.

When all of the DDCBs 6-420A and/or 6-420B associated with the PMCB 6-402A have been issued and posted, the Queue Manager 6-412 will call the IORB Processor 6-402 to post that IORB 6-20 and return it to the application.

Figure 4A:
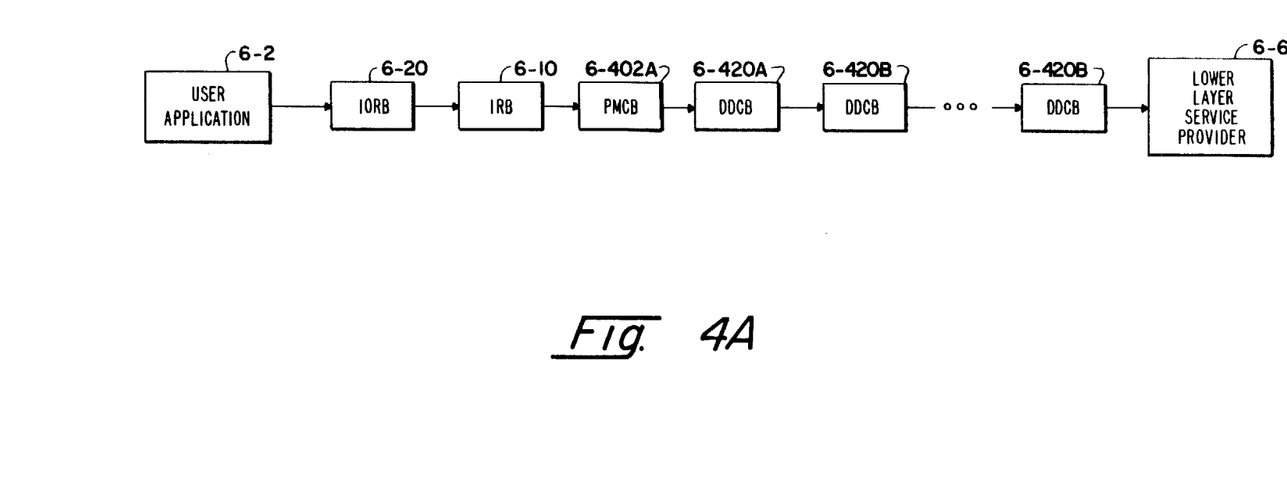
FIG. 4A shows the interconnection between the request block and control block data structures which execute an order.

FIG. 4A shows the structures involved in the processing of an operation. The Application 6-2 generates an IORB 6-20. The Operating System (OS) 6-1 receives the IORB 6-20 and creates an Indirect Request Block 6-10 (IRB). The IRB's 6-10 are used by the OS 6-1 for handling various kinds of requests. The IORBs are just one level of request handled by the IRBs.

The IORB 6-20 and the IRB 6-10 are passed to the NTD 6-4. The IORB Processor 6-402 verifies that the IORB 6-20 is valid, and if so, the IRB 6-10 will be pointed to a Provider Module Control Block (PMCB) 6-402A.

The PMCB 6-402A is used for maintaining the status of the overall operation during the execution of the micro orders in response to the IORB 6-20. The Provider Module 6-440 creates a number of Device Drive Control Blocks (DDCB) on behalf of either the Application Module 6-420 Connect Processor or Disconnect Processor. The Queue Manager 6-412 issues the DDCBs one at a time.

As an example a DDCB 6-420A could be sent to the terminal 14 or workstation 18 via the Lower Layer Service Provider 6-6 and MLX-16 Processor 10 to establish a connection between the terminal 14 and the workstation 18 and Application 6-2 then a DDCB 6-420B would be sent to terminal 14 or workstation 18 via the Lower Layer Service Provider 6-6 and MLX-16 Processor 10 to send the cursor to a particular part of the terminal 14 or workstation 18 screen. Still another DDCB 6-420B would send data to the terminal 14 or workstation 18 for display. Yet another DDCB 6-420B would return the cursor to its original position on the screen.

Figure 4B:
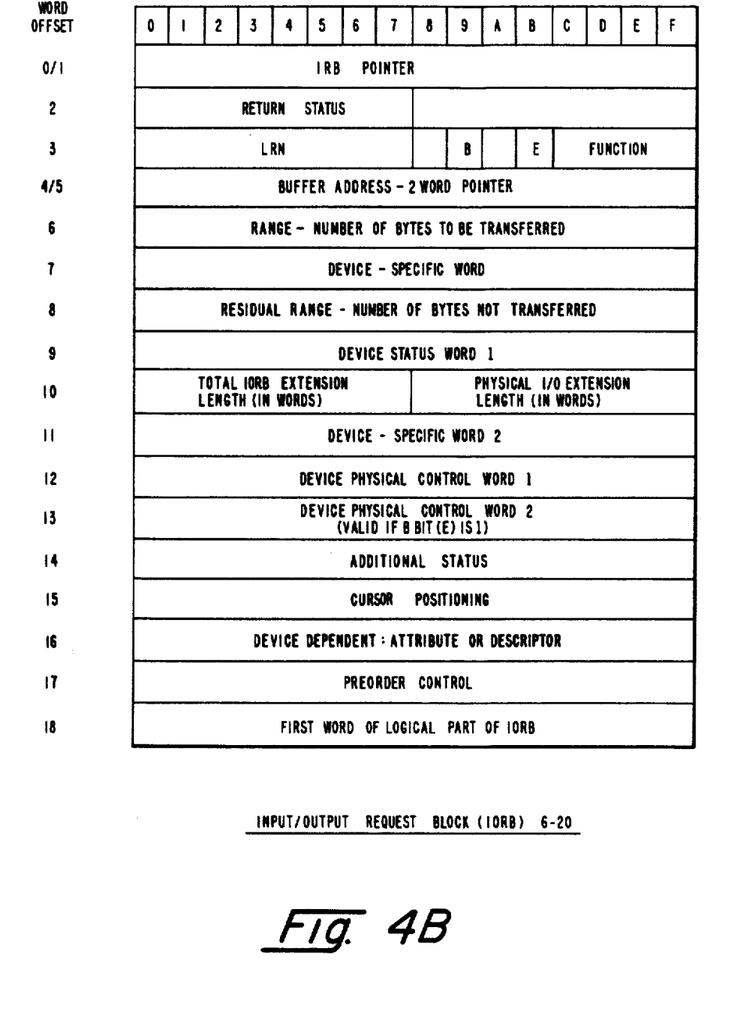
FIG. 4B shows the layout of an Input Output Request Block (IORB) data structure.

Referring to FIG. 4B, the IORB 6-20 includes an inventory of 16 bit words having bit positions hexadecimal 0 through F. Word Offsets 0 and 1 point to the IRB 6-10 in main memory 6 and is managed by the OS 6-1.

Word Offset 2 includes a return status byte to indicate, for example, if the device was unavailable, or the operation was aborted, or there was invalid information passed to the device by the application.

The left byte of Word Offset 3 contains the Logical Resource Number (LRN) which identifies the device for which IORB 6-20 is intended, that is, the terminal 14 or printer 16 or workstation 18, etc. The right byte includes the function code which describes the operation the IORB 6-20 is to perform. Typical functions are connect, disconnect, read or write. The B bit in position 9 indicates if the buffer starts in the left hand or right hand byte of the word. The E bit in position B indicates that the IORB 6-20 is extended for at least 10 words. The IORB 6-20 normally ends after Word Offset 9. The extension is typically used for field mode and its size is always stored in Word Offset 10.

Word offsets 4 and 5 contain the two word (32 bit) starting address in main memory 6 of the data buffer which stores the data involved in the transfer between the device and main memory 6 if this is a transfer IORB 6-20. Word Offset 6 stores the range, that is the number of bytes being transferred.

Word Offset 7 is a device specific word. It includes bits indicating the options to include with the order. As an example, for the Field Mode 6-404 application, a bit specifies that data keyed for a read IORB 6-20 is also displayed on the screen.

Word Offset 8 indicates at the completion of an order, the number of bytes not transferred.

Word Offset 9 stores the Device Status Word 1 which provides additional status to the status stored in Word Offset 2. An example would be to indicate if a parity error was sensed by the Lower Layer Service Provider 6-6 during a read operation.

Word Offset 10, byte 1 stores the number of words the IORB 6-20 is extended by. Byte 2 stores the number of words in the IORB 6-20 extensions. This word is only present when the E bit position in Word Offset 3 is set to logical one.

Device Specific Word 2 of Word Offset 11 provides further information on how the order is to be processed. In Field Mode, for example, this Word Offset would specify the validation criteria, either a standard or a special validation set.

Word Offset 12 indicates some of the physical characteristics of executing the order; for example, the number of key strokes used by the operator. It also provides information for the supervisory message line at the bottom of the display screen at connect time.

Word Offset 13 serves two purposes. Initially for Field Mode reads, it contains an offset to the field position where data entry should begin. Finally when the read is completed it stores an indication of the number of remaining characters ready for immediate processing upon receiving the next read order from the application. This enables the application to create the next read IORB with a range large enough to handle the remaining characters.

Word Offset 14 stores additional status information. For example, during Field Mode it indicates that valid data was entered into the field by the operator.

Word Offset 15 contains information for the application to determine the location of the cursor at the completion of the order.

Word Offset 16 contains information that identifies the character keyed by the operator that terminated the read order. Word Offset 16 also stores an indication of whether or not an illegal entry was made.

Word Offset 17 has multiple purposes. Initially it provides pre-order information. As an example, it could send a line feed, carriage return character before starting the order. It may also set the display attributes for the order such as low intensity, blink and inverse video. Word Offset 11 bits define the use of Word Offset 17. Upon termination of the read order it indicates the characteristics that the illegal entry did not satisfy. For legal entry it may contain additional read termination information.

Word Offset 18 provides the first word of the descriptor for a read operation. The descripter specifies the characteristics of the data to be entered into the field.

Figure 4C:
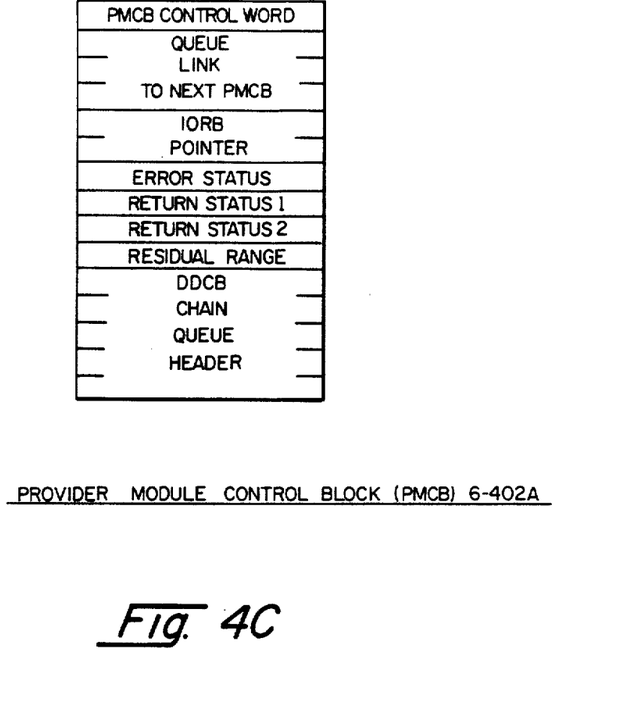
FIG. 4C shows the layout of a Provider Modules Control Block (PMCB) data structure.

FIG. 4C shows the contents of the PMCB 6-402A. The PMCB 6-402A is associated with an IORB 6-20 by the IORB Processor 6-402. It is used to hold together all the micro orders (DDCBs) associated with this IORB 6-20.

The PMCB Control Word indicates the type of PMCB 6-402A this is. IORBs 6-20 specify read operations and write operations for the Application Modules 6-420. The Control Word also provides information to the Queue Manager 6-412 such as "purge" which indicates that this PMCB 6-402A should be deleted, "modify" which indicates that information has been added to or removed from the PMCB. This informs the Queue Manager 6-412 to initialize an internal pointer.

The Queue Link to next PMCB is used to locate the next PMCB 6-402A in the queue. A number of PMCB's may be queued to process the application's requests.

The PMCB's IORB pointer stores the memory 6 location of its associated IORB.

Error Status 1 gets copied into the left byte of Word Offset 2 of the IORB 6-20.

Return Status 1 and Return Status 2 are continually updated by the DDCBs and in turn update Word Offset 9 and Word Offset 14 of the IORB 6-20 at the conclusion of the order.

Residual Range is transferred to Word Offset 8 at the end of the order to indicate the number of bytes not transferred.

The DDCB Chain Queue Header points to the first DDCB in the chain to be processed.

Figure 4D:
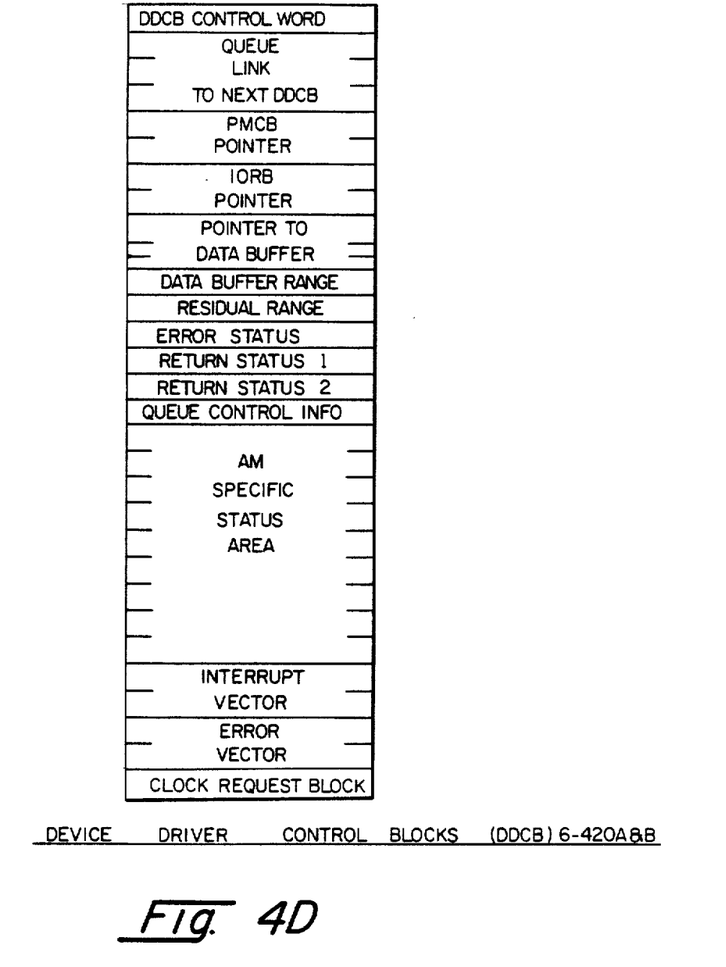
FIG. 4D shows the layout of a Device Descriptor Control Block (DDCB) data structure.

FIG. 4D shows the contents of the DDCB. The DDCB Control Word identifies the type of micro order, that is, a write, a write control, a read, no-operation (NOP) or an event. Also included is a bit indicating that this DDCB is marked for deletion. Another bit indicates that this DDCB has been sent to the lower level service provider 6-6 and is awaiting posting.

The Queue Link to next DDCB links this Link DDCB to the next DDCB in the queue.

The PMCB pointer field points to its associated PMCB 6-402A.

The IORB pointer, when used, indicates that the pointer to the Data Buffer is that of the IORB Data Buffer as opposed to an internal NTD Data Buffer.

The Pointer to Data Buffer points to the starting address of either the IORB Data Buffer in main memory 6 or an NTD internal data buffer in main memory 6. These Data Buffers are only specified for a Data Transfer DDCB.

Data Buffer Range specifies the number of bytes in the Data Buffer.

Residual Range specifies the number of bytes not transferred.

Error Status stores an indication of errors sensed during processing.

Return Status 1 and Return Status 2 update the respective fields in the PMCB.

Queue Control Info is used by the Application Module 6-420 to tell the Queue Manager 6-412 how to treat this micro order and how the processing of this DDCB micro order will affect the processing of other DDCBs on this queue.

Application Module Specific Status Area stores the Application specific status of this micro order and updates Offset Words 12 through 17 of the IORB 6-20.

The interrupt vector is generated by the creator of the DDCB if more processing is needed when this DDCB is posted.

The error vector is used by the Queue Manager 6-412 to point to an error processing routine specified by the creator of the DDCB in the event of an error during the processing of this DDCB.

The Clock Request Block specifies the timeout associated with this order. When the order is issued, the Operating System uses the information to set a clock and start a timer. If the timer expires before the DDCB is posted, then an error condition is recorded.

FIGS. 5A through 5E describe a typical write NTD 6-4 operation. When the Application 6-2 requests a communication with a user, a number of IORBs 6-20 are generated. They connect NTD 6-4 to the terminal 14 or workstation 18 to establish a connection. This allows the user to turn the terminal 14 or workstation 18 on. An IORB 6-20 also establishes a read operation. This requests the operater to enter data for examination by the Application 6-2.

A write IORB, sends information from the Application 6-2 to the terminal 14, printer 16 or workstation 18. FIGS. 5A, 5B, 5C, 5D and 5E explain what the NTD 6-4 does when it receives an IORB from the Application 6-2. Whether the IORB calls for a connect, disconnect, read or write operative, NTD 6-4 goes through the same processing steps.

For this example, once the terminal 14 or workstation 18 is connected, the connect channel program in the MLX-16 Processor 10 will interrupt the NTD driver and the NTD 6-4 will run until the entire connect IORB has been procesed.

Figure 5A:
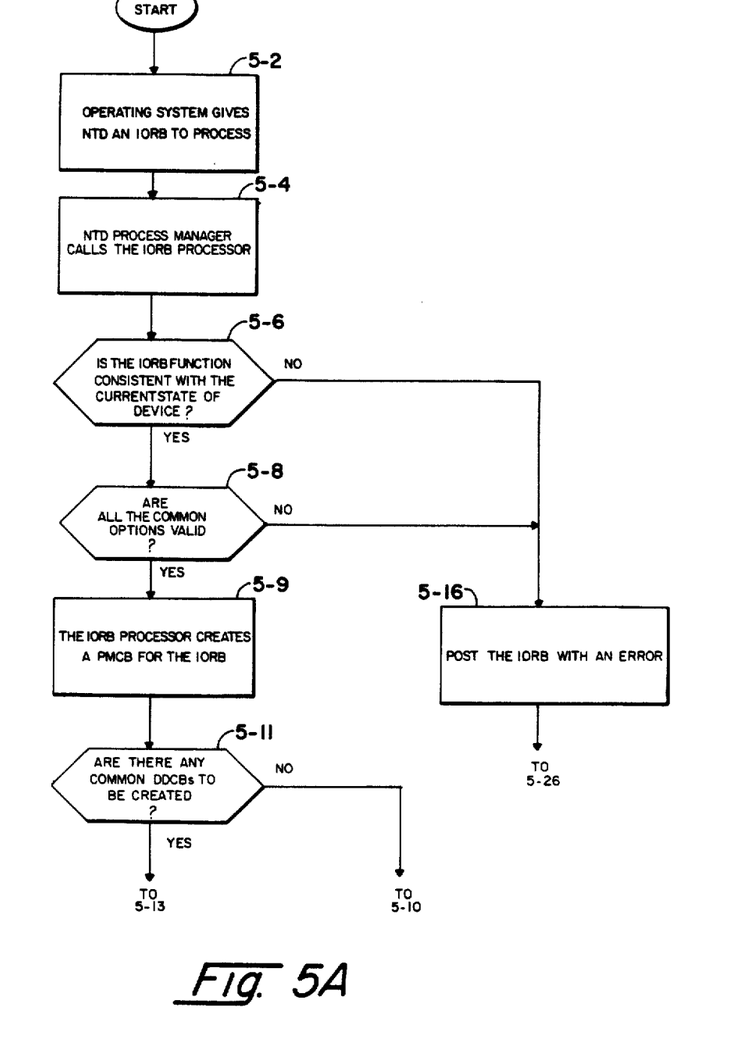
FIGS. 5A–5E shows a flow diagram of a typical operation of the Network Terminal Driver.

Referring to FIG. 5A, in block 5-2 the Operating System 6-1 takes an IORB 6-20 from Application 6-2 and passes it to NTD 6-4. In block 5-4, the Process Manager 6-416 takes the IORB 6-20 and passes it to the IORB Processor 6-402.

In decision block 5-6, the IORB Processor 6-402 checks the Function Field (bits C-F) of Word Offset 3, FIG. 4B of the IORB 6-20 to see if it is consistent with the current state of the terminal 14 or workstation 18. For example a write would not be allowed against a device that has not been connected.

If the test fails, then block 5-16 posts the IORB 6-20 with an error. If the test is successful, then decision block 5-8 test the validity of the common IORB options which are specified in Word Offsets 7, 10, and 11. These options include that the proper Application Module of Application Modules 6-420 and that the proper type of device terminal 14, printer 16 or workstation 18 are connected. Here again, an unsuccessful test results in block 5-16 posting the IORB 6-20 with an error.

If the test is successful then in block 5-9 the IORB Processor 6-402 creates a PMCB 6-402A for the IORB 6-20.

Figure 5B:
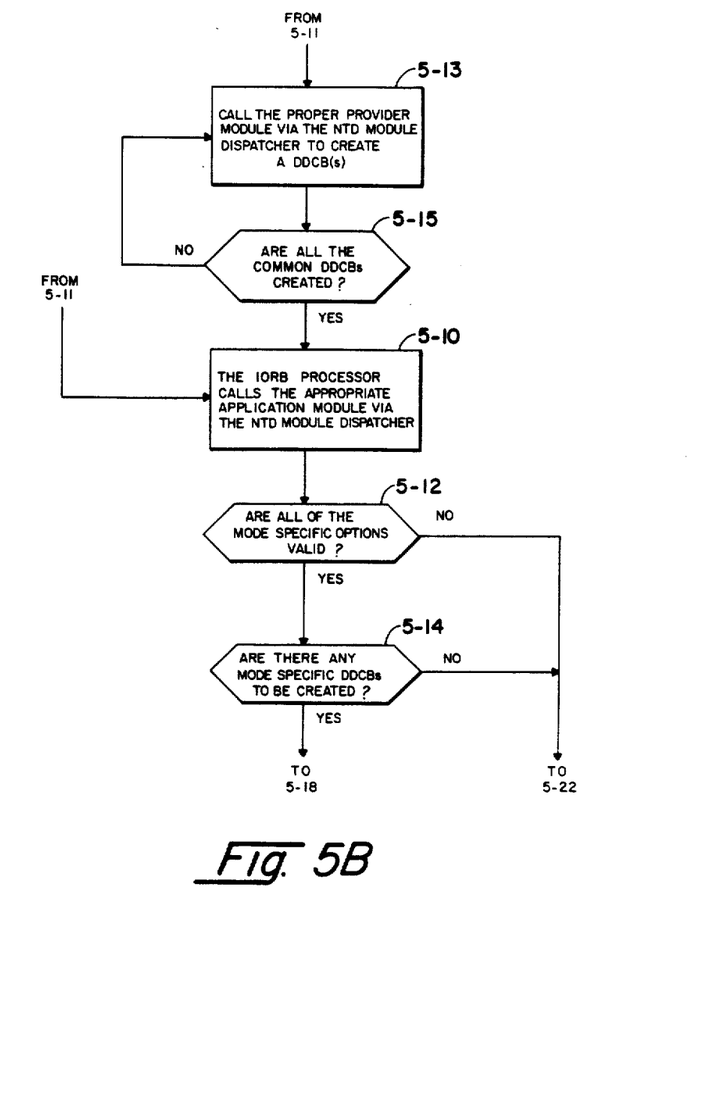

Decision block 5-11 tests if there are any common DDCBs 6-420A to be created and if so block 5-13, figure 5B, calls the selected Provider Module 6-442 through 6-446 via the Module Dispatcher 6-414 to create the DDCB 6-420A.

Decision block 5-15 tests if anymore DDCB 6-420A are to be created. If so then block 5-13 again performs as described supra.

After all the required common DDCB 6-420A are created or decision block 5-11 indicates that no common DDCB 6-420A are to be created then in block 5-10, the IORB Processor 6-402 calls the appropriate Application Module 6-422 through 6-430 via the Module Dispatcher 6-414.

Decision block 5-12 then tests if the mode specific options are valid. If so, then decision block 5-14 tests if there are any mode specific DDCBs 6-420B are to be created. If so block 5-18, FIG. 5C, calls the proper Provider Module 6-442 through 6-446 via the Module Dispatcher 6-414 to create the necessary DDCB 6-420A or 6-420B. Decision block 5-20 loops on block 5-18 until all of the necessary DDCB 6-420A and 6-420B are created.

Figure 5C:
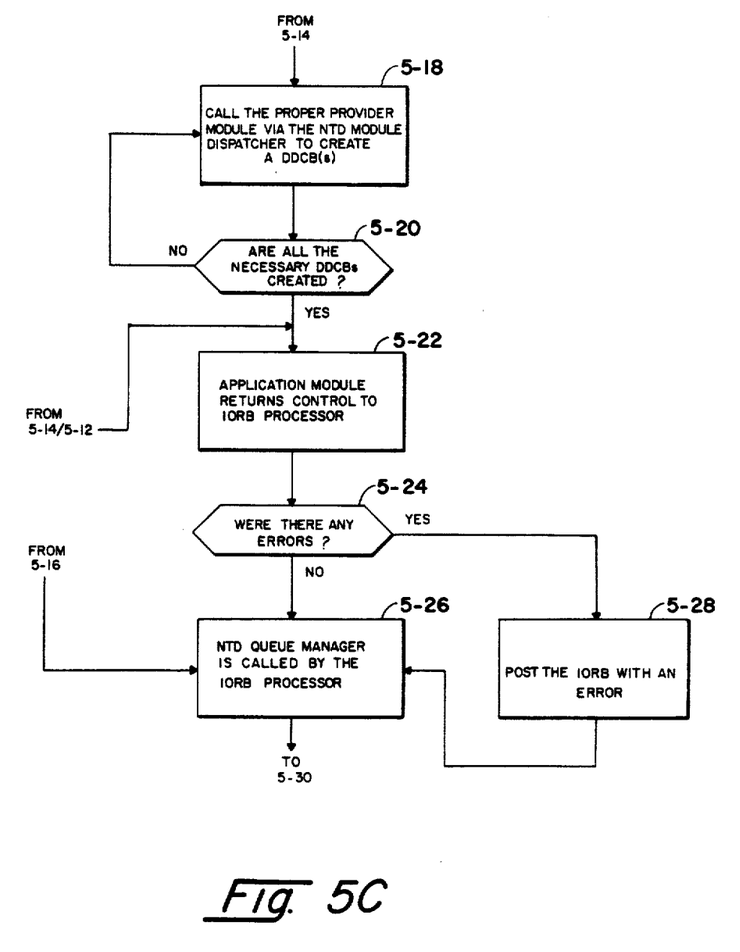

Then in block 5-22 the Application Module 6-422 through 6-430 returns control to the IORB Processor 6-402.

Decision block 5-24 checks for errors including those from decision blocks 5-12 and 5-14. If there were errors then in block 5-28, the error is posted in the IORB Word Offsets 2 and 9. In block 5-26 the IORB Processor 6-402 calls the Queue Manager 6-412. Decision block 5-30, FIG. 5D, first checks to see if any DDCBs need to be posted.

Figure 5D:
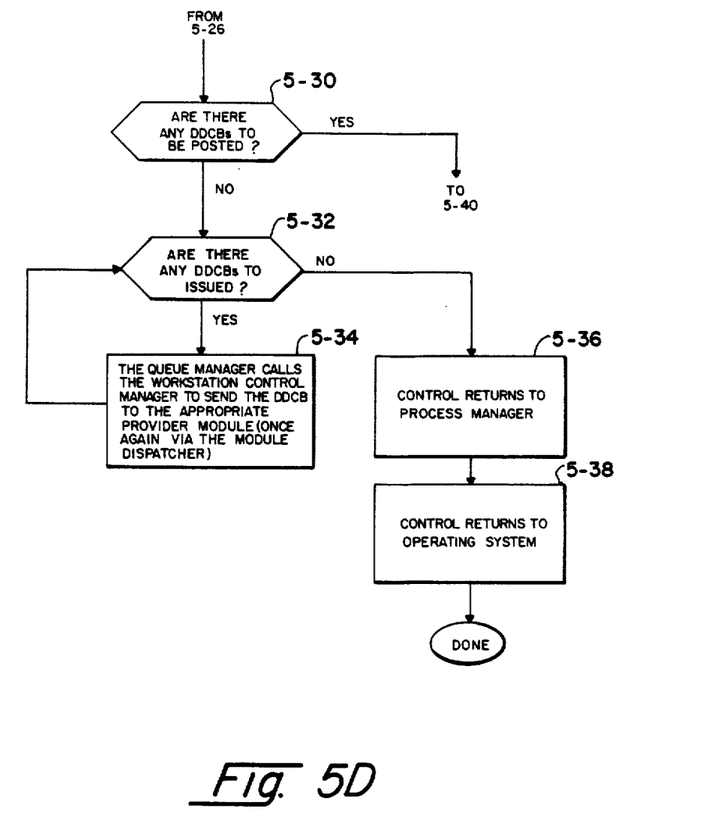

Decision block 5-32 then checks if any DDCBs can be issued to the Lower Layer Service Provider 6-6. If DDCBs can be issued then in block 5-34, the Queue Manager 6-412 calls the Workstation Control Manager 6-418 and sends the DDCB to the appropriate Provider Module 6-422 through 6-446 via the Module Dispatcher 6-414. This operation is repeated through decision block 5-32 and block 5-34 until all of the DDCBs have issued. Then block 5-36 returns control to the Process Manager 6-416 and in block 5-38 control returns to the Operating System 6-1 and the operation is completed.

Figure 5E:
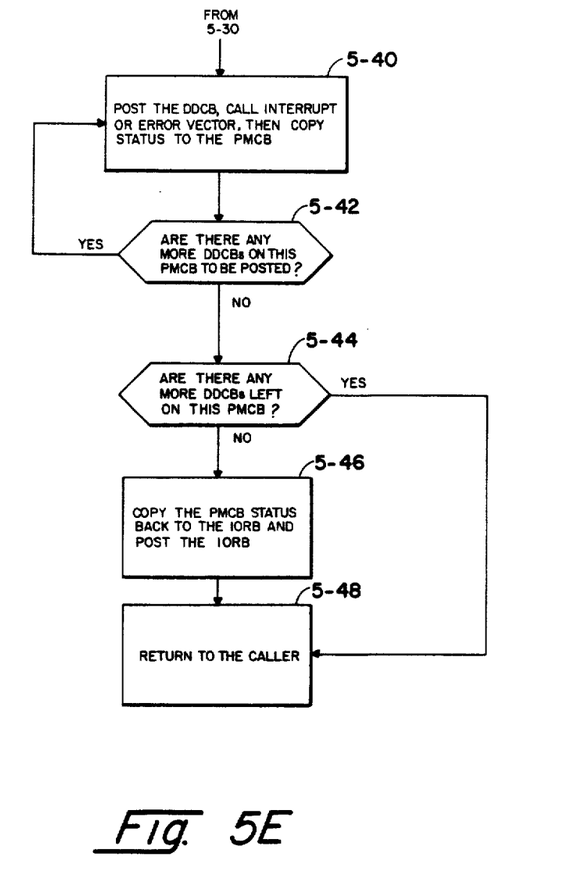

If in decision block 5-30, there are DDCBs to be posted then block 5-40, FIG. 5E, the Queue Manager 6-412 posts one DDCB. If the status word in the DDCB indicates an error then the error vector is called. The creator of DDCB (usually the Application Module) tries to correct the error. Posting the DDCB calls for the Queue Manager 6-412 to test the interrupt vector. If this is not zero and the DDCBs status words do not indicate an error, then the function pointed to by the interrupt vector is called. This is usually a function in the Application Module. The status words are copied to the PMCB and is written into Word Offsets 8, 9, 12, 13, 14, 16 and 17 of the IORB.

Decision block 5-42 tests if there are more DDCBs to be posted. If so, block 5-40 posts them. When the last DDCB is posted then decision block 5-44 tests if there are any more DDCBs left on this PMCB.

If there are DDCBs remaining on the DDCB then in block 5-48 control passes to the caller, in this case the Queue Manager 6-412. If there are no DDCBs left in this PMCB then in block 5-46 the PMCB status is copied back to the IORB and the IORB Processor 6-402 is called to post the IORB back into the Application 6-2. Then in block 5-48 this post process returns to the caller.

What is claimed is:

1. In a data processing system comprising:
   a central processing unit (CPU);
   a memory unit connected to the CPU for storing system programs and application programs to be run by the CPU and for storing data to be operated upon by the programs;
   a plurality of terminals of one or more types at which users enter commands requesting application programs to be run by the CPU and view results of those programs; and
   one or more communications media of one or more types, each for interconnecting the CPU with certain of the terminals of the plurality of terminals,
   a network terminal driver operatively connected between the CPU and the communications media for facilitating communication between the application programs and the plurality of terminals, the network terminal driver comprising;
   a plurality of application modules, each associated with a different data format used by the application programs, for specifying data formats being used by each of the application programs;
   a plurality of provider modules, each associated with a different one of the types of communications media, for specifying the characteristics of each of the communications media;
   a plurality of device profiles, each associated with a different one of the types of terminals, for specifying the characteristics of each of the terminals; and
   means responsive to said specifications of data formats, communications media characteristics, and terminal characteristics for interpreting transmissions from the communications media and assembling messages to the communications media according to said specifications of data formats, communications media characteristics, and terminal characteristics.

2. The data processing system recited in claim 1, wherein further:
   a certain application program encountering an instruction directing it to communicate with a certain terminal generates and forwards to the network terminal driver a first request block;
   the network terminal driver, responsive to the first request block and one certain of the application modules according to the data type used by the certain application program, generates a second request block;
   the network terminal driver, responsive to the second request block and to one certain of the provider modules according to the certain communications medium by which the certain terminal is connected, generates at least one third request block;
   the network terminal driver, responsive to the second request block and one certain of the device profiles according to the type of the certain terminal, generates one or more fourth request blocks; and
   the third and fourth request blocks are input to a lower layer service provider which is responsive to the third and fourth control blocks to perform communication over the certain communication medium to the certain terminal,
   whereby the lower layer service provider performs the communication between the CPU and the certain terminal according to the data type used by the certain program, the protocol employed by the certain communications medium, and the characteristics of the certain terminal.

* * * * *